United States Patent [19]
Larson

[11] 3,870,874

[45] Mar. 11, 1975

[54] SELF-CONTAINED LIGHT SOURCE DEVICE FOR CENTER MOUNTING OF PHOTOGRAPHIC REFLECTOR

[76] Inventor: Raymond George Larson, 9731 Rainier Cir., Huntington Beach, Calif. 92646

[22] Filed: July 23, 1973

[21] Appl. No.: 381,926

[52] U.S. Cl. ............. 240/1.3, 240/11.4, 240/41.1, 240/51.12
[51] Int. Cl. ........................................ G03b 15/02
[58] Field of Search ....... 240/1.3, 44.1, 41.1, 46.03, 240/46.19, 51.12, 11.4, 20

[56] References Cited
UNITED STATES PATENTS
2,794,906  6/1957  Edgerton .................. 240/51.12 X
3,294,962  12/1966  Hilzen ........................ 240/41.1 X Primary Examiner—Richard L. Moses
Attorney, Agent, or Firm—Mahoney, Schick & Cislo

[57] ABSTRACT

A photographic light source for use in photography wherein the unit is self-contained and is provided with means to centrally mount a reflector apparatus or device which is utilized in photography for obtaining light balance with respect to the subject of which photographs are to be made. The uniqueness of center mounting permits ease of handling the reflector with which the device of the invention is utilized thereby permitting ease of handling because of placement of center of gravity of the reflector in conjunction with the self-contained light source of the invention thereby insuring stability.

3 Claims, 5 Drawing Figures

3,870,874

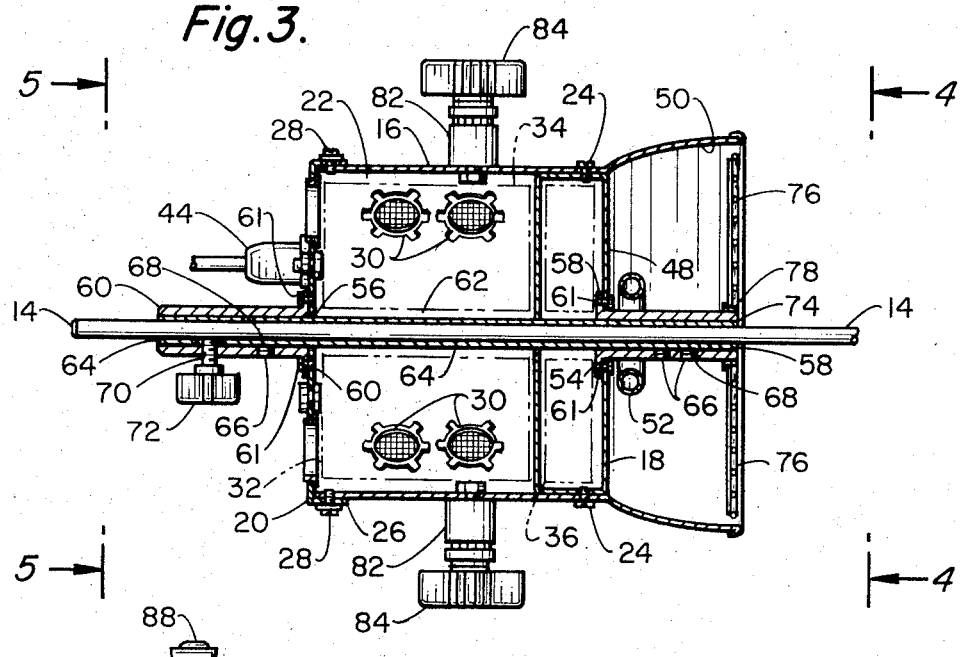
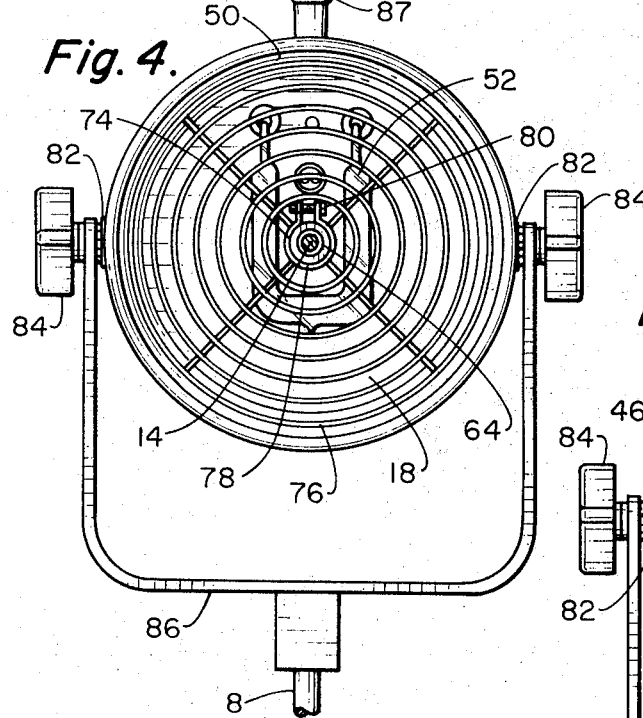
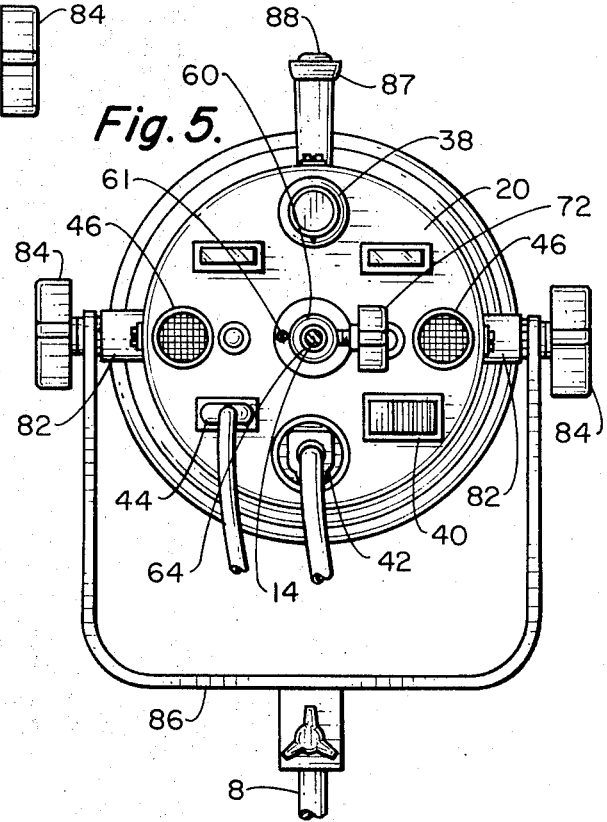

SELF-CONTAINED LIGHT SOURCE DEVICE FOR CENTER MOUNTING OF PHOTOGRAPHIC REFLECTOR

BACKGROUND OF THE INVENTION

In photography circles where photographers are expected to transport their equipment to various studios and even where the equipment is to be used in one studio, a light source and some means of reflecting light from that light source, is imperative. The reflective abilities of various reflective devices used in photography becomes most important when the photographer seeks to create particular and specific lighting effects.

Heretofore, photography devices, and more specifically light sources, have required a separately supported reflector or alternately, a light source having an awkward, unstable, mechanical association or linkage for the reflector to be used to reflect light from the light source. The prior art configurations have either created bulky, uneasily handled support structures or have involved structures which have not been mindful of the physical principles relating to center of gravity and stability.

With the hereindisclosed invention, a light source for photography purposes which is self-contained and which is adapted to center mount a reflector device, is disclosed which overcomes all of the above-described deficiencies.

By having the light source configured to centrally mount a reflector frequently used in sophisticated photography, an easily transportable, easily handled and easily movable stable device is possible.

OBJECTS AND SUMMARY OF THE INVENTION

It is an object of the invention to provide a self-contained light source for photography purposes which will centrally mount a reflector.

It is another important object of the invention to provide a self-contained light source for photography and other purposes which mounts a reflector in a stable and facilitated manner.

It is still another more important object of the invention, to provide a photographic light source which is self-contained and which is configured to receive a reflector in centrally supported relationship.

It is still another more important and specific object of the invention, to provide a self-contained light source which is adapted to centrally receive a reflector in axially movable and securable relationship.

It still another and more important object of the invention to provide a self-contained light source for photographic purposes which centrally mounts a reflector to reflect light in order to obtain various photographic light effects.

It is another and even more specific object of the invention to provide a self-contained light source for photographic purposes wherein mounting means for mounting a reflector device in shiftable relationship is provided, which mounting means is centrally located on the front end rear walls of the housing of the self-contained light source device.

These and other objects of the invention will become apparent in view of the hereinafter following commentary taken in conjunction with the drawings.

Basically, in an exemplary embodiment, the invention pertains to a photography light source device for the cooperative center mounting of a reflector comprising the combination of an outer housing forming an interior chamber.

A front and rear wall enclose the chamber and the front and rear walls have centrally located mounting means for mounting an elongated rod through the chamber in supported shiftable relationship. The elongated rod, in turn, supports a reflector device to reflect light to the object to be photographed. A light source is mounted on the exterior of the chamber and electrical means is provided within the interior of the chamber which is in electrical conductive relationship with the light source and which is adapted to be connected to an energy source to energize the light source.

BRIEF DESCRIPTION OF THE DRAWINGS

FIG. 3 is a view taken along the line 3—3 of FIG. 2;

FIG. 4 is a view taken along the line 4—4 of FIG. 3; and

FIG. 5 is a view taken along line 5—5 of FIG. 3.

DESCRIPTION OF THE BEST EMBODIMENTS CONTEMPLATED

Referring to the various figures of drawings wherein like numerals of reference designate like elements throughout, it will be seen that the device 2 of this invention involves a self-contained light source for the center mounting of a reflector such as 4 in stable relationship. The device 2 is provided with mounting means such as 6 whereby the device 2 is supported from tripod-like device or structure 8. The reflector 4 may be of the umbrella type, that is, one being foldable and one which has reflective surface fabric so as to cast light on to a subject as will be more readily apparent from the following description. The reflector 4, as well as the specific mounting means 6 and the tripod structure 8 form no part of the invention and thus will not be delved into herein inasmuch such matters are well known to those of skill in the photography art.

Figure 1:
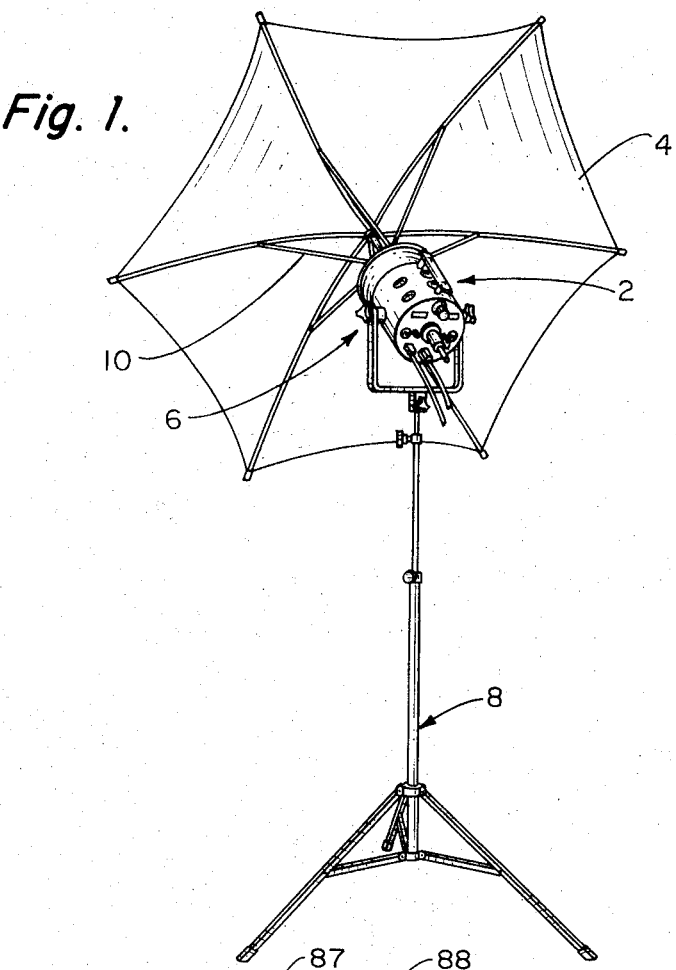
FIG. 1 is a perspective view illustrating the device of the invention in conjunction with a reflector and a supporting tripod structure.
Figure 2:
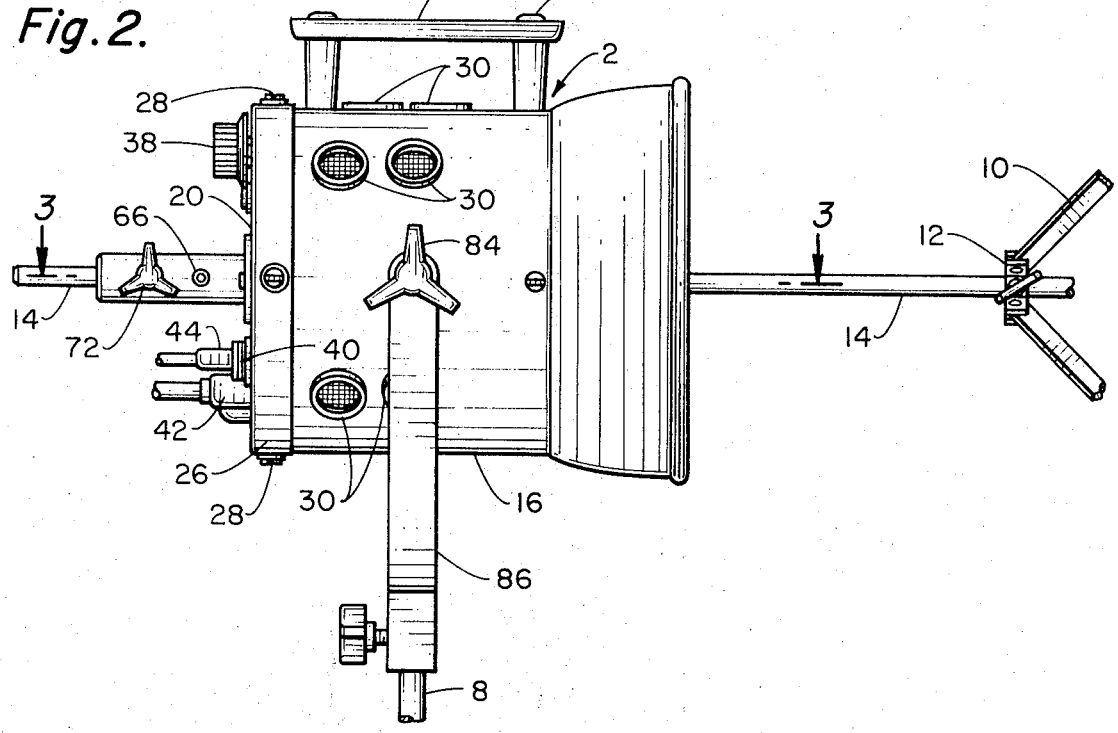
FIG. 2 is a side view of the device of this invention as illustrated in FIG. 1.

Suffice to say, that the reflector device 4 has struts 10 forming the collapsible support structure for the fabric making up the device, which struts terminate in a collar 12 and generally has an aperture therein to receive an elongate rod such as 14 for fixation to various support structure, as for example, a tripod support such as the one 8 shown in FIG. 1.

However, in the device of this invention, it will be seen that the elongate rod 14 of the reflector 4, is centrally received through the device 2 in axially shiftable relationship as will now be more fully and specifically detailed.

The device 2 of the invention comprises an outer housing member 16 defining with an inner set wall 18 and a rear wall 20 (forming in cooperation with housing 16) an interior compartment or chamber 22.

The front wall 18 is annular in shape, conforming to the annular configuration of a major portion of the exterior housing 16, and is of doubled wall construction secured to exterior housing 16 by means of screws 24. The rear wall 20 has a similar annular configuration congruent to the major portion of exterior housing 16 and has an overlying lip or flange 26 by which means the rear wall 20 is secured to the outer housing as by means of screws 28.

The exterior wall of housing 16 is provided with screened apertures 30 in order to allow heat dissipation because of heat buildup within the chamber 22. Within chamber 22 is electrical circuitry 32, 34 and 36 designated by the dashed lines (FIG. 3) and forming no part of the invention. The rear wall 20 is provided with various apertures and slots to accommodate the various controls, power connections, etc. for the device 2 and all of which do not form any part of the invention. For example, rear wall 20 accommodates light intensity knob 38, on-off switch 40, electrical inlet plug 42, camera actuation plug 44 and other such control devices as those of ordinary skill in the art will recognize. Rear wall 20 is also provided with screened apertures 46 to allow for heat dissipation.

The exterior surface 48 of front wall 18 and the inner surface 50 of the projecting outer housing projecting beyond the exterior of front wall surface 48 is light reflective for purposes that will become apparent. The front wall 18 supports a light source or bulb 52 which, upon energization, emits light which is reflected outward of the device 2 and to the opposed surface of the reflector 4 as best seen in FIG. 1.

Front wall 18 and rear wall 20 are provided with central apertures 54 and 56 respectively, to which is secured front mounting means 58 and rear mounting means 60. The mounting means 58 and 60 are in the form of bosses or stub bushings which are secured to the front and rear walls 18 and 20 respectively, by means of screws or bolts 61, or other manner well known in the art.

It will be seen that a central through-bore 62 has been formed through the center of compartment or chamber 22 and separated from the electrical components 32, 34 and 36 so as to accommodate the elongated sleeve 64 which is positioned through the center of chamber 22 and extends therethrough terminating at the termini of securement members 58 and 60 and being held in place by set screws 66 threaded into threaded apertures 68 in order to rigidly secure the sleeve 64 in secured relationship with securement or mounting means 58 and 60. It will be noted that the interior diameter of mounting means 58 and 60 are sufficiently large to receive the sleeve 64 in somewhat tight or flush relationship. The set screws 66 ensure secured relationship.

The rear supporting means 60 is provided with a threaded aperture 70 which accommodates a screw thumb-like securement member 72 for purposes as will now be described. The elongate rod 14 of the reflector device 2 is positionable within the sleeve 64 and the sleeve 64 has an inner bore of sufficient diameter to receive elongate rod 14. It will be noted that the reflector 4 therefore, by means of being connected to the elongate rod 14, is axially shiftable towards and away from the light source or bulb 52 by reason of the sleeve 64. Upon proper positioning of the elongate rod 14 with respect to the light bulb or source 52, the thumb bolt 72 is tightened in order to retain same in secured relationship.

Secured to the end 74 of mounting means 58, is a screen or grid 76 which protects the light bulb or light source 52 from mechanical damage. The grid 76 has an inner collar 78 which is clamp-like in configuration so that the grid 76 may be secured to the outer periphery of the end 74 by means of bolt 80.

The lateral or side walls of housing member 16 are provided with bushing-like members 82 secured to the exterior wall thereof by means well known, as for example, by through bolt or nut or other cooperating means and mounts thumb screws 84 which permits mounting to U-shaped or yoke-like support member 86 which in turn, may be mounted to tripod support device 8, not forming a part of this invention.

To the exterior top wall of housing 16, is mounted handle member 87 which is mounted in conventional fashion by through bolts 88 and retaining nuts (not shown) all in conventional fashion.

Thus, there has been disclosed and described a self-contained lighting unit or source of light which centrally mounts a reflector apparatus, all in a stable and unitary fashion eliminating separate support structure for the reflector and eliminating awkward unstable support structure for the reflector.

Various changes and modifications will suggest themselves to those of ordinary skill in the art and although the device of the invention has been specifically described and illustrated, all such changes and modifications will not depart from the spirit and essence of the invention as defined in the appended claims.

It will be apparent to those skilled in the photography art that a device has been disclosed that is not only more easily handled, but also permits almost perfect light control for the photographer utilizing the device. That is, because the light source is centrally located with respect to the reflector, little or no light fall-off or dissipation results. Thus, the photographer using the device of the invention may obtain equal intensity of reflected light on the subject he intends to photograph. Obviously, not only is the efficiency of the light increased because the light is more efficiently reflected, but additionally, the photographer need not be mindful of other problems that had heretofore presented themselves with regard to poor lighting. Therefore, the photographer need not be concerned with lens correction and similar attendant problems where balanced lighting was not available.

I claim:

1. A photography light source device for cooperative center mounting of a reflector comprising the combination of: an outer housing forming an interior chamber and having a flared end which is of larger diameter than the remainder of said housing; a rear wall member secured to said housing opposite said flared end; a front wall member inwardly positioned with respect to said flared end and secured to said housing adjacent said flared end; said front wall and the interior surface of said flared end having light reflective surfaces; each of said front and rear wall members having aligned outwardly extending boss-like members having a bore therethrough an elongate sleeve member disposed within the bore of said boss-like members and extending through said interior chamber; means for securing said sleeve member to said boss-like members; an elongate rod shiftably disposed in said sleeve member for mounting a light reflector; said boss-like members extending a sufficient distance exteriorly of said front and rear walls to provide a support for said elongate sleeve member and said elongated rod when the latter is positioned within said sleeve member; a light source mounted within said flared end of said outer housing;

a light-protective screen or grid member secured to the front wall boss-like member in front of said light source; means secured to the side of the outer housing for mounting said housing or a tripod support member; said sleeve member and said rear boss-like member having aligned threaded openings when secured together adapted to receive a thumbscrew for locking said elongate rod in selected positions; and electrical means mounted within said chamber in electrical conductive relationship with said light source and adapted to be connected to an energy source to energize said light source.

2. The device in accordance with claim 1 wherein each said boss-like members have at least one threaded aperture carrying a set screw to retain said sleeve in secured relationship therewith.

3. The device in accordance with claim 2 including tripod coupling, supporting means secured to the sides of said outer housing whereby said device is mounted to a tripod support member.

* * * * *